United States Patent Office 3,031,440
Patented Apr. 24, 1962

3,031,440
POLYMERIZATION OF OLEFINS WITH A CATALYST OF A GRIGNARD REAGENT AND AN ALUMINUM CONTAINING TITANIUM COMPOSITION
Daniel Kaufman, Metuchen, and Bryce H. McMullen, Matawan, N.J., assignors to National Lead Company, New York, N.Y., a corporation of New Jersey
No Drawing. Original application May 6, 1958, Ser. No. 731,082. Divided and this application May 1, 1959, Ser. No. 810,245
4 Claims. (Cl. 260—93.7)

The present invention relates in general to polymers prepared from olefinic monomers. The invention further contemplates an improved low-pressure process for making superior olefinic polymers such as polyethylene and poly-propylene. It further relates to the production of a novel salt composition which is useful in forming a unique polymerization catalyst system.

Interest today appears to center around so-called low-pressure polymerization processes as distinguished between high-pressure techniques which are well-known in the art. Although it is reported that some success has been achieved in the low-pressure production of polyethylene, to applicants' knowledge no one has, to date, developed a commercially feasible process for producing other polyolefins. Further it appears that known low-temperature, low-pressure processes for producing polyethylene produce a non-homogeneous product which comprises a mixture of various types of polyethylenes having a variety of softening temperatures, molecular weights and degrees of crystallinity. These non-homogeneous products must, therefore, be fractionated in order to obtain end products which are commercially usable for known applications.

An object, therefore, of the present invention is to provide superior polymers of olefinic monomers.

Another object of the invention is to provide an improved process for producing, on a commercial scale, superior polymers from olefinic monomers and in particular polyethylene and polypropylene.

An additional object of the invention is to provide an improved method for producing homogeneous polymers of olefinic monomers at low temperatures and pressures using commercial grade olefins and operational controls having latitudes that readily adapt the method to the production of high yields economically and on a commercial scale.

A further object of the invention is to provide an improved method for polymerizing olefinic monomers using a unique catalyst system.

A further object of the invention is to provide an improved catalyst system which is economical, unaffected by common catalyst poisons and which can be used with equal effectiveness for polymerizing various olefinic monomers such as ethylene and propylene.

A still further object of the invention is to provide a new titanium composition and method for making the same, said composition being useful in the unique catalyst system referred to above.

These and other objects, features and advantages of the invention will become apparent from the following more complete description.

Broadly, the instant invention contemplates (1) a polymerization process including the preparation of an anhydrous titanium composition for use in a catalyst system for polymerizing olefinic monomers by admixing finely divided aluminum metal, titanium tetrachloride and an organic solvent and heating the mixture to a temperature between 80° C. and 220° C., forming a catalyst system therefrom by mixing the titanium composition so formed with a Grignard reagent and an inert organic solvent, polymerizing therewith an olefinic monomer by adding said monomer to said catalyst system retained in a closed vessel while maintaining within said vessel a pressure within the range of from atmospheric to 500 p.s.i. and a temperature within the range of from 10° C. to 70° C.; and (2) the polymers resulting from the practice of said process.

TITANIUM COMPOSITION

The anhydrous titanium composition of this invention is essentially a trivalent titanium composition in which the titanium and aluminum values are combined with chlorine.

In general the titanium composition is prepared by admixing finely divided aluminum metal with titanium tetrachloride and an organic solvent and heating the admixture to at least 80° C. to as high as about 220° C. At temperatures higher than about 220° C. the desired reaction product does not appear to form. However, within the specified temperature range homogeneous granular crystals are formed. These may be recovered from the reaction mass by first allowing the latter to cool and then filtering the crystals from the solvent; or the crystals may be left in the solvent and used therein for the polymerization of olefinic monomers as hereinafter described. The titanium composition is readily soluble in water and is very finely divided, the particle size of the bulk of the material being less than 5 microns.

In preparing the titanium composition the amounts of reagents used are substantially the theoretical amounts required to reduce the tetravalent titanium values to the trivalent state, i.e., one mole of finely divided aluminum metal for three moles of titanium tetrachloride, these proportions being hereinafter identified as stoichiometric amounts. While these amounts are preferred they are not critical since if an excess of aluminum metal is used the aluminum in excess of the stoichiometric amount will remain unreacted; while if more than a stoichiometric amount of titanium tetrachloride is added the excess likewise will remain unreacted.

Substantially any inert organic solvent may be employed provided it is capable of dissolving titanium tetrachloride but incapable of reacting therewith. Although solvents that boil within the reaction temperature range of from 80° C. to 220° C. are preferred solvents having higher boiling points may be used. Among the most common organic solvents which may be employed are kerosene, mineral spirits, paraffin oil, mineral oil, xylene, toluene, benzene, naphthalene and tetralin as well as halogenated hydrocarbons such as chlorobenzene and the like.

When the titanium composition is prepared by reacting aluminum metal with titanium tetrachloride in the presence of an organic solvent the crystals produced contain varying amounts of the organic solvent associated therewith. The amount of associated organic solvent varies considerably and is dependent upon the operational conditions employed. Should it be desirable to remove some or even a major portion of the solvent any standard extraction process may be employed. Up to 9/10 of the organic solvent can be readily removed by simple extraction methods using various agents, e.g., toluene, petroleum ether, carbon disulfide and the like. Compositions containing as little as 3-4% organic solvent have been prepared in this manner.

The following examples will serve to illustrate the preparation of the titanium composition.

Example I

One mole of pigmentary grade flake aluminum metal was added to three liters of kerosene. Three moles of titanium tetrachloride were added to the mixture which was previously heated to 200° C. The titanium tetrachloride was added dropwise over a one hour period. After four hours of heating, the mass was allowed to cool. A large amount of black, homogeneous crystals of the titanium composition was obtained. The entire mass was filtered and the filtration rate was exceedingly rapid. The crystals, containing kerosene, were then washed in toluene and dried under an inert atmosphere and stored in a closed container to prevent oxidation.

The yield of crystals obtained was substantially 100% of the theoretical amount calculated, and substantially all of the aluminum metal was reacted. The crystals also contained solvent in amount of 40% by weight.

These crystals were readily soluble in water and produced a yellowish colored solution.

These crystals were identified as being a titanium composition in which the titanium values were essentially trivalent and had the following X-ray diffraction pattern:

| $d$ | $I/I_1$ |
|---|---|
| 6.91 | Very strong. |
| 5.32 | Medium. |
| 5.10 | Do. |
| 4.55 | Weak-medium. |
| 3.95 | Weak. |
| 3.03 | Medium. |
| 2.94 | Weak-medium. |
| 2.90 | Do. |
| 2.72 | Do. |
| 2.52 | Strong. |
| 2.13 | Weak. |
| 1.96 | Weak-medium. |
| 1.80 | Medium. |
| 1.77 | Medium-strong. |
| 1.70 | Weak-medium. |
| 1.47 | Do. |

$d$=interplanar spacings expressed in angstrom units.
$I/I_1$=relative intensities.

Example II

The procedure of Example I was repeated except that mineral spirits was used in place of kerosene. The reaction was carried out at 160° C. for three hours. Again a substantially 100% yield of black homogeneous crystals was obtained. The crystals had 33% by weight mineral spirits associated with the titanium composition.

In order to remove most of the mineral spirits associated with the crystals, the crystals were placed in a Soxhlet extractor with carbon disulfide and the extraction was run for 18 hours. The extracted crystals were then removed from the extractor. The crystals analyzed as follows:

| | Percent by weight |
|---|---|
| Ti | 23.4 |
| Al | 4.6 |
| Cl | 64.4 |
| Org | 7.6 |

These crystals had the same X-ray diffraction pattern as that previously described except that the pattern was more distinct.

The same titanium composition was prepared using various other solvents including mineral oils, paraffin oils, xylene, toluene, benzene, Stoddard's solvent, chlorobenzene and the like by the same methods as that described in the above examples. The temperatures at which the various reactions were carried out were between 80° C. and 220° C. and were selected so that the temperature was either below or at the boiling point of the respective solvents used. In all cases the products were substantially identical to the products described in the above examples.

With respect to the X-ray diffraction patterns, a few of the compositions produced had very weak patterns which were relatively difficult to identify. However, upon extracting a portion of the organic solvent associated with the crystals, the X-ray diffraction pattern became distinct and easy to identify as the pattern of the crystals of the instant invention.

This composition dissolves readily in water to form a yellowish solution and will remain dissolved in water. It also disperses readily in hydrocarbons. Another advantageous property of this salt composition is its relative insensitivity to poisons, such as Lewis bases including ethers; amines, i.e., pyridine, dimethylaniline; sulfur compounds, i.e., thiophene, and the like which normally render titanium compounds inactive in catalytic systems.

Earlier known catalyst systems have only been adaptable to the production of polymers on a commercial scale by maintaining the strictest kind of operational controls and the use of highly pure olefins. Moreover the products of such catalyst systems are not consistently homogeneous, thereby necessitating expensive fractionating and leaching steps to recover a commercially acceptable polymer; nor has it been possible to use the same catalyst system with equal success with all classes of olefins.

CATALYST SYSTEM

It has now been discovered that the titanium composition of this invention is an effective catalytic constituent for the polymerization of olefinic monomers when used in a catalyst system consisting of the titanium composition, a Grignard reagent and an inert organic solvent.

The Grignard reagent of the catalyst system may be either a lower alkyl or phenyl Grignard reagent. Among the most useful lower alkyl Grignard reagents are those of methyl, ethyl, propyl, butyl, isobutyl and cyclohexyl. Phenyl Grignards, both non-substituted and substituted may be employed. The substituent in the substituted phenyl group may be lower alkyl or phenyl. The term "lower alkyl" is meant to include those having from 1 to 8 carbon atoms in the hydrocarbon radical.

The third constituent of the catalyst system is an organic solvent. It has been postulated that the function of the solvent is to dissolve the olefin and to disperse or suspend the anhydrous titanium composition and the Grignard reagent during polymerization reaction. Whatever may be its actual function its presence has been found to be necessary to the polymerization of olefins. Moreover, it must be inert, that is to say, non-reactive with the anhydrous titanium composition and the Grignard reagent. Among the solvents having these characteristics are aromatic solvents among the most useful of which are benzene, toluene, and xylene; and aliphatic solvents such as normal heptane and cyclohexane. It is, moreover, within the purview of the invention to use mixtures of aromatic and aliphatic solvents.

The catalyst system may be prepared in advance of its use for polymerizing olefinic monomers, by admixing the anhydrous titanium composition with the Grignard reagent and an organic solvent. Typical amounts of reactants to be used in runs using a reactor of 4 liter capacity are as follows: titanium composition within the range of from 0.05 to 0.1 moles as titanium; Grignard reagent in amounts within the range of from 0.03 to 0.6 moles; organic solvent within a range of from 300 ml. to 2000 ml. For economic reasons, it is desirable that the total volume of the catalyst system to be used in any run be determined with regard to the amount of olefin to be reacted so as to insure high efficiencies of operation.

In brief, the olefinic monomers are polymerized in the presence of the above-described catalyst system in a closed vessel under prescribed temperature and pressure conditions.

POLYMERIZATION OF ETHYLENE

In particular, in carrying out the process of the instant invention to polymerize ethylene it is convenient, although not necessary, to introduce the catalyst system, which may be prepared in advance of its use as hereinabove described, into a pressure vessel and to add to this mixture gaseous ethylene under pressure. The reaction mixture should be maintained at a temperature from 10° C. to 70° C. and preferably not permitted to go above 60° C. during the entire reaction in order to prevent inferior types, i.e., fractions which have lower softening points, lower molecular weights and lower degrees of crystallinity, of polyethylene from forming. Thus it has been found that if the temperature is allowed to rise above 70° C. the polymerization process apparently undergoes certain changes which produce inferior types of polyethylene. The polyethylene produced at temperatures above 70° C. will be in the form of large, hard lumps which tend to fuse to the sides of the reactor and are extremely difficult to remove. If, however, the temperature is maintained between 10° C. and 60° C. during the entire reaction the polyethylene produced is finely divided, crystalline and homogeneous. Moreover, it may be easily removed from the reactor and in general contains no significant amounts of inferior polyethylene fractions, i.e., fractions which have lower softening points, lower molecular weights and lower degrees of crystallinity. At temperatures below about 10° C. the reaction is so slow as to be impractical for useful purposes. The heat developed by reaction of the constituents on a small scale may be adequate to maintain the reaction temperature within the range of from 10° C. to 70° C. but if not, auxiliary heating should be used. However, on a large scale it may be necessary to remove heat from the reactor. At the end of the reaction substantially all of the ethylene will have been utilized and the pressure will drop to zero. In carrying out the reaction it has been found desirable to use mole ratios of the Grignard or Grignard alkyl to titanium within the range of 1 to 1 and 6 to 1, preferably between 2 to 1 and 3 to 1.

The polyethylene produced by the process of the instant invention is a soft, powdery material, the size of the individual particles being within the range of from 5 to 100 microns. Further, it is homogeneous, i.e., consists only of the superior type of polyethylene described herein and not of a mixture of various polyethylene fractions. Moreover, it is linear and possesses a high degree of crystallinity.

In contrast to the processes currently in use for producing polyethylene, the ethylene employed in the instant invention does not have to be a chemically pure grade of ethylene. It has been found that the process of the instant invention may be carried out with equal success using technical grade ethylene. Since a technical grade (95% pure) ethylene is about one-third the cost of a chemically pure (99.5%) ethylene this factor alone effects a considerable reduction in the overall cost of a polymerization process using this invention.

Also unexpectedly, it has ben observed that in contradistinction to currently used processes the aromatic or aliphatic solvent employed does not require extensive purification. Small amounts of oxygenated materials in the solvents such as ether, moisture and the like may be present without adversely affecting polymerization. Hence, commercially available technical grades may be used directly.

In order to illustrate the polymerization of ethylene by the method of this invention, the following examples are given:

Example III

A catalyst system was prepared by admixing 0.1 mole of titanium added as the titanium composition, 0.2 mole of essentially ether-free methyl magnesium iodide in 400 ml. of benzene. This catalyst system was introduced into a rocking autoclave having a 4 liter void after which it was sealed and technical grade ethylene gas was admitted at a constant pressure of 50 p.s.i. The ethylene was added for 8 hours during which time the temperature in the autoclave was maintained between 10° C. and 40° C. Whenever the temperature approached 40° C., the ethylene addition was temporarily halted to avoid overheating. At the end of the run the autoclave was opened and a finely divided polyethylene was removed. The polyethylene was washed with methanol to remove the catalyst and was then dried at 60° C. 540 grams of polyethylene were obtained. The product softened over a narrow temperature range between 270° C. to 275° C., it was insoluble in tetralin at 200° C. and possessed a high molecular weight and a high degree of crystallinity. When molded, the molded article had a yield strength of 2,300 p.s.i. with an ultimate tensile strength of 3,800 p.s.i. and an elongation of 250%. Its torsional modulus was 54,000 p.s.i at 25° C. and 74,000 p.s.i at −50° C.

Additional runs were made according to the procedure of Example III but using various amounts of the titanium composition, various organic solvents and somewhat different operation conditions. These runs were set out in Table I below:

TABLE I
[Polymerization of Ethylene (T.G. Ethylene)]

| Ex. | Catalyst System | | | Temp. (°C.) | Pressure (p.s.i.) | Time (hrs.) | Yield (gms.) |
|---|---|---|---|---|---|---|---|
| | III Ti Comp. (moles Ti) | Grignard (mole) | Organic Solvent (ml.) | | | | |
| IV | 0.1 | 0.2 methyl MgI | 100—diethylether / 400—benzene | 10-40 | 50 | 8 | 535 |
| V | 0.2 | 0.2 ethyl MgBr | 400—toluene | 10-40 | 100 | 6 | 350 |
| VI | 0.1 | 0.1 propyl MgCl | 300—kerosene / 100—toluene | 30-40 | 500 | 15 | 540 |
| VII | 0.1 | 0.6 phenyl MgBr | 600—xylene | 20-40 | 50 | 10 | 320 |
| VIII | 0.1 | 0.6 butyl MgBr | 400—xylene | 20-40 | 130 | 10 | 410 |
| IX | 0.1 | 0.3 isopropyl MgCl | 1,500—mineral spirits | 20-60 | 140 | 2 | 180 |
| X | 0.1 | 0.3 cyclohexyl MgCl | 400—cyclohexane | 20-40 | 130 | 20 | 310 |
| XI | 0.05 | 0.2 propyl MgCl | 400—normal heptane | 20-60 | 500 | 20 | 250 |
| XII | 0.1 | 0.25 methyl MgI | 2,000—toluene | 60 (max.) | 80 | 2 | 325 |
| XIII | 0.1 | 0.25 methyl MgI | 1,800—chlorobenzene / 100—toluene | 60 (max.) | 80 | 21 | 419 |
| XIV | 0.01 | 0.03 methyl MgI | 2,000—toluene | 25-48 | 120 | 19 | 230 |

The physical properties of the polymers produced under the specifically controlled conditions set out in the above examples are given in Table II below:

TABLE II
[Physical Properties of Polyethylene]

| Soft. Temp., °C. | Solubility | Mol. Wt. | Yield Strength, p.s.i. | Tensile Strength | Torsional Modulus |
|---|---|---|---|---|---|
| (a) 270–275 | Insol. in tetralin at 200° C. | $2 \times 10^6$ to $3 \times 10^6$ | 2,300 | 3,800 p.s.i. elong. of 250% | 54,000 @ 25° C. 74,000 @ −50° C. |
| (b) 260–270 | Insol. in tetralin at boiling. | $1.5 \times 10^6$ to $2.5 \times 10^6$ | 1,300 | 3,600 p.s.i. elong. of 320% | 50,000 @ 25° C. 110,000 @ −50° C. |

(a) Examples IV–VIII, XII.
(b) Examples IX–XI, XIII–XIV.

To show the uniformity of polyethylene produced by the instant invention several samples of the product produced by the procedure of Example III were treated with solvents, that is to say, acetone, diethyl ether, n-heptane, respectively, as extraction media. After each extraction the extraction media was removed and the amount of solubilized polymer was determined. The following results were obtained:

(a) Extraction with acetone—0.0%.
(b) Extraction with diethyl ether—Trace percent.
(c) Extraction with n-heptane—0.5%.

Moreover, to demonstrate the stability of the catalyst system the procedure described in Example XIV was repeated except that 0.025 mole of pyridine was added to the catalyst mixture. It was discovered that the yields and quality of the end product were substantially identical to those obtained in Example XIV. This observation is extremely significant in that whereas pyridine and similar sulphur containing constituents seriously poison those prior art catalysts which have heretofore been described, the presence of these poisons and in particular sulphur has no harmful effect on the catalyst system of this invention.

The polyethylene product produced by the process of this invention has many applications as various articles of commerce such as for example, film, sheeting material, flexible containers, sterilizable containers, tank linings, seat covers, rope and the like.

POLYMERIZATION OF PROPYLENE

In addition to its uses for polymerizing ethylene the catalyst system of this invention has been found to successfully polymerize propylene, both to produce polymers of this monomer having unique physical characteristics and also in yields of such magnitude as to insure commercial production.

The method used is similar to that used in the production of polyethylene except that, in general, the pressure range is narrower while the temperature range is somewhat wider. The method for producing polymers of propylene is illustrated by the following examples:

Example XV

A catalyst system was prepared by admixing 0.1 mole of titanium added as the titanium composition and 0.2 mole of methyl magnesium iodide containing 15% ether in 400 ml. of benzene. This catalyst system was introduced into a rocking autoclave of 4 liter capacity after which the autoclave was chilled and technical grade propylene gas was admitted at a constant pressure of 140 p.s.i. The propylene was added for 17 hours during which time the temperature in the autoclave was maintained between 10° C. and 35° C. At the end of the run the autoclave was opened and a granular polypropylene was removed. The finely divided propylene was washed with methanol to remove the catalyst and was then dried at 60° C. 450 grams of polypropylene were obtained.

Additional runs were made according to the procedure of Example XVI by using various amounts of the titanium composition and Grignard reagents, various organic solvents and somewhat different operation conditions. These runs are set out in Table III below:

TABLE III
[Polymerization of Propylene (T.G. Propylene)]

| Ex. | Catalyst System | | | Temp. (°C.) | Pressure (p.s.i.) | Time (hrs.) | Yield (gms.) |
|---|---|---|---|---|---|---|---|
| | III Ti Comp. (moles Ti) | Grignard (mole) | Organic Solvent (ml.) | | | | |
| XVI | 0.1 | 0.1 methyl MgBr | 400 toluene | 10–40 | 135 | 20 | 250 |
| XVII | 0.1 | 0.2 methyl MgI | 400 xylene | 10–40 | 25 | 48 | 198 |
| XVIII | 0.1 | 0.2 methyl MgI | 100 kerosene / 2,000 toluene | 20–70 | 400 | 10 | 300 |
| XIX | 0.1 | 0.6 butyl MgBr | 400 xylene | 20–40 | 130 | 10 | 350 |
| XX | 0.1 | 0.3 propyl MgCl | 300 benzene / 100 mineral spirits | 20–40 | 140 | 20 | 275 |
| XXI | 0.1 | 0.6 phenyl MgBr | 400 benzene | 20–40 | 132 | 72 | 400 |
| XXII | 0.1 | 0.3 Cyclohexyl MgCl | 400 cyclohexane | 20–40 | 130 | 20 | 398 |
| XXIII | 0.05 | 0.2 propyl MgCl | 400 normal heptane | 20–60 | 350 | 20 | 200 |
| XXIV | 0.1 | 0.25 methyl MgI | 1,800 chlorobenzene / 100 toluene | 60 (max.) | 121 | 21 | 520 |

The polypropylene made under the specific operating conditions set out in the above examples had a softening temperature range of from 185° C. to 210° C., a high molecular weight and yield strength, a tensile strength as high as 3,619 p.s.i., was insoluble in tetralin at 160° C. and had flexibility ratio to temperature of 1.9 over a temperature range of from 25° C. to −50° C.

The polypropylene product is a highly crystalline, homogeneous, macromolecular polymer which may be molded into various articles of commerce such as containers, pipes, hose, sheeting and the like; and drawn into fibers. Various samples of polypropylene were made into fibers by extruding the polymer through a 0.43″ die using a Carver laboratory press. The best fibers were obtained at temperatures within the range of from 240° C. to 250° C. and at a pressure of about 1500 p.s.i. Subsequent cold drawing of these fibers increased their tensile strength indicating that orientation of the crystallites occurred.

As was found true of ethylene, the process of this invention for producing polypropylene does not require the use of a chemically pure grade of propylene; nor is it necessary to use highly pure grades of aromatic or aliphatic solvents.

To show the uniformity of the polypropylene product produced by the instant invention, several samples of the product produced by the procedure of Example XV were treated with solvents such as acetone, diethyl ether and n-heptane, respectively, as extraction media.

After each extraction the extraction media was removed and the amount of solubilized polymer was determined. The following results were obtained:

(a) Extraction with acetone—Trace percent.
(b) Extraction with diethyl ether—0.2%.
(c) Extraction with n-heptane—2.0%.

Moreover, to demonstrate the stability of the catalyst system when polymerizing propylene the experiment of Example XXIV was repeated except that 0.025 mole thiophene was added to the mixture. It was discovered that the yields and quality of the end product were substantially identical to those obtained in Example XXIV again supporting the significant discovery that the presence of sulphur has no detrimental effect on the effectiveness of the catalyst system of this invention.

The unique catalyst system of this invention may also be effective for polymerizing mixtures of monomeric olefins.

From the above description and foregoing examples, it will be seen that by utilizing the superior catalyst system of this invention, olefinic monomers such as ethylene and propylene, can be polymerized by a relatively simple, unique and efficient process. Further the polymerized products are homogeneous, can be reproduced in successful runs without substantial variations in quality and yield and are produced in the form of relatively fine powder having a particle size in the range of from 5 to 100 microns. In this powdery form the polymers may be emptied from the reactor by the simple expedient of inverting the reactor upon completion of a run.

Other advantages stemming from the use of the improved catalyst system of this invention are the complete adequacy of technical grade olefinic monomers and freedom from the need for maintaining precise operational controls as well as care in avoiding the presence of small amounts of moisture, oxygen, nitrogen and even sulphur in the system.

This application is a division of our application Serial No. 731,082, filed May 6, 1958.

While this invention has been described and illustrated by the examples shown, it is not intended to be strictly limited to the specific olefinic monomers described herein but it is within the purview of the invention to employ other olefinic monomers and variations and modifications of the process within the scope of the following claims:

1. Method for polymerizing an olefinic monomer, selected from the group consisting of ethylene and propylene, which comprises admixing said monomer and a catalyst system consisting essentially of an anhydrous titanium composition, a Grignard reagent and an inert organic solvent, said anhydrous titanium composition having the following X-ray diffraction pattern:

| d | I/I$_1$ |
|---|---|
| 5.91 | Very strong. |
| 5.32 | Medium. |
| 5.10 | Do. |
| 4.55 | Weak-medium. |
| 3.95 | Weak. |
| 3.03 | Medium. |
| 2.94 | Weak-medium. |
| 2.90 | Do. |
| 2.72 | Do. |
| 2.52 | Strong. |
| 2.13 | Weak. |
| 1.96 | Weak-medium. |
| 1.80 | Medium. |
| 1.77 | Medium-strong. |
| 1.70 | Weak-medium. |
| 1.47 | Do. |

$d$=interplanar spacings expressed in angstrom units.
I/I$_1$=relative intensities.

said anhydrous titanium composition prepared by mixing together finely divided aluminum metal, titanium tetrachloride and an inert organic solvent and heating the resulting mixture to a temperature between 80° C. and 220° C. to form said composition, said Grignard reagent selected from the group consisting of lower alkyl Grignard reagent and phenyl Grignard reagent, the ratio of said Grignard reagent to said titanium composition in said catalyst system being from 1 to 6 moles of Grignard reagent for each mole of titanium, polymerizing said monomer in the presence of said catalyst system in a closed vessel while maintaining within said vessel a pressure within the range of atmospheric to 400 p.s.i. and a temperature within the range of from 10° C. to 70° C. for propylene and maintaining a pressure within the range of atmospheric to 500 p.s.i. and a temperature within the range of from 10° C. to 60° C. for ethylene, until polymerization of said monomer is substantially complete as indicated by a drop in pressure to atmospheric and separating the polymer so formed from the reaction mixture.

2. Method according to claim 1 in which the olefinic monomer employed is ethylene.

3. Method according to claim 1 in which the olefinic monomer employed is propylene.

4. Method according to claim 1 in which from 2 to 3 moles of Grignard reagent are employed for each mole of titanium composition.

References Cited in the file of this patent

UNITED STATES PATENTS

| 2,886,561 | Reynolds | May 12, 1959 |
| 2,893,984 | Seelbach et al. | July 7, 1959 |
| 2,899,413 | Hagemeyer et al. | Aug. 11, 1959 |
| 2,905,645 | Anderson et al. | Sept. 22, 1959 |
| 2,980,660 | Ralls | Apr. 18, 1961 |

FOREIGN PATENTS

| 526,101 | Italy | May 14, 1955 |
| 1,132,506 | France | Nov. 5, 1956 |

OTHER REFERENCES

Ruff et al.: "Zeitschrift fur Anorganishe Chemie," 1923, pp. 81–95.

Chemical and Engineering News, Apr. 28, 1958, vol. 36, No. 17, p. 46.